(12) United States Patent
Asnis et al.

(10) Patent No.: US 10,425,981 B2
(45) Date of Patent: Sep. 24, 2019

(54) NETWORK-BASED USER IDENTIFICATION

(71) Applicant: ROKU, INC., Los Gatos, CA (US)

(72) Inventors: Ilya Asnis, San Jose, CA (US); Gregory M. Garner, Springdale, AR (US); Tito Thomas, San Jose, CA (US); Anthony Wood, Palo Alto, CA (US)

(73) Assignee: ROKU, INC., Los Gatos, CA (US)

( * ) Notice: Subject to any disclaimer, the term of this patent is extended or adjusted under 35 U.S.C. 154(b) by 141 days.

(21) Appl. No.: 15/478,444

(22) Filed: Apr. 4, 2017

(65) Prior Publication Data

US 2018/0288813 A1 Oct. 4, 2018

(51) Int. Cl.
*H04W 4/02* (2018.01)
*H04W 4/80* (2018.01)
*H04L 12/24* (2006.01)
*H04W 76/14* (2018.01)
*H04L 29/06* (2006.01)
*H04L 29/08* (2006.01)
*H04L 29/12* (2006.01)
*H04W 84/12* (2009.01)
*H04W 88/08* (2009.01)

(52) U.S. Cl.
CPC ............. *H04W 76/14* (2018.02); *H04L 41/08* (2013.01); *H04L 65/4092* (2013.01); *H04L 67/16* (2013.01); *H04L 67/18* (2013.01); *H04L 67/306* (2013.01); *H04W 4/80* (2018.02); *H04L 61/103* (2013.01); *H04L 61/6022* (2013.01); *H04W 4/023* (2013.01); *H04W 84/12* (2013.01); *H04W 88/08* (2013.01)

(58) Field of Classification Search
CPC .... H04L 41/08; H04L 61/103; H04L 61/6022
See application file for complete search history.

(56) References Cited

U.S. PATENT DOCUMENTS

| 9,949,127 | B1 * | 4/2018 | Tas ..................... H04W 12/08 |
| 2003/0076837 | A1 * | 4/2003 | Whitehill .......... H04L 29/12009 370/395.4 |
| 2015/0031289 | A1 * | 1/2015 | Agarwal ................ H04W 4/80 455/41.1 |
| 2015/0117420 | A1 * | 4/2015 | Raman .................. H04L 61/103 370/338 |
| 2015/0237412 | A1 * | 8/2015 | Shimy .................. H04N 21/812 725/12 |

* cited by examiner

*Primary Examiner* — Ranodhi Serrao
(74) *Attorney, Agent, or Firm* — Sterne, Kessler, Goldstein & Fox P.L.L.C.

(57) ABSTRACT

Disclosed herein are system, method, and computer program product embodiments for network-based user identification. An embodiment operates by transmitting a discovery signal over a network, and receiving a response to the discovery signal from a mobile device coupled to the network. Based on the response it is determined whether the mobile device is within a threshold vicinity of the streaming media device. Which if it is, user settings corresponding to a user of the mobile device, which may also be a user of another device associated with the settings are determined. The other device is then configured based on the user settings.

12 Claims, 11 Drawing Sheets

NETWORK-BASED USER IDENTIFICATION

CROSS-REFERENCE TO RELATED APPLICATIONS

This application is related to U.S. patent application Ser. No. 14/813,703 entitled "Detection Of A Mobile Device To Identify User Preferences And Provide Customized Functionality Or Content", filed Dec. 3, 2015, which is a continuation in part of U.S. patent application Ser. No. 14/813,703 entitled "Detection Of A Smart Phone To Enable Content", filed Jul. 30, 2015; patent application Ser. No. 13/778,068, entitled "Method and Apparatus for Sharing Content", filed Feb. 26, 2013; U.S. patent application Ser. No. 14/966,576, entitled "User Identification Based On The Motion Of A Device", filed Dec. 11, 2015; patent application Ser. No. 15/478,448, entitled "Interaction-Based User Identification", filed herewith, and patent application Ser. No. 15/478,413, entitled "Time and Content Restrictions Based on User-Identification", filed herewith, all of which are hereby expressly incorporated herein by reference in their entireties.

BACKGROUND

Field

This disclosure is generally directed to network-based user identification.

Background

In today's world, on-demand availability of content—such as movies, TV shows and music, to name just a few examples—is commonplace. But the electronic and computerized storage and delivery of content offers the potential for far more than just the availability and vanilla playback of content. For example, through innovative use of technology, it is possible to generate content recommendations that are tailored for individual users, as well as to customize the viewing experience to each user's personal preferences. However, to generate useful recommendations and customized the viewing experience for users, it would be helpful to be able to accurately identify the user who is viewing or otherwise consuming the content at any given moment.

SUMMARY

Provided herein are system, apparatus, article of manufacture, method and/or computer program product embodiments, and/or combinations and sub-combinations thereof, for using technology in innovative ways to provide enhanced media streaming functionality, including automatic, accurate user identification.

An embodiment is directed to system, apparatus, article of manufacture, method and/or computer program product embodiments, and/or combinations and sub-combinations thereof, for network-based user identification. In a non-limiting embodiment, an apparatus, such as a streaming media device, may transmit a discovery signal over a network. The streaming media device may receive a response to the discovery signal from a mobile device operating on the network. The mobile device may be associated with a user of the streaming media device. Based on the response, it may be determined that the user is within a threshold vicinity of the streaming media device. One or more user settings corresponding to the user may be determined. The streaming media device or another device may be configured based on the one more user settings.

An additional embodiment is directed to system, apparatus, article of manufacture, method and/or computer program product embodiments, and/or combinations and sub-combinations thereof, for interaction-based user identification. In a non-limiting embodiment, an apparatus receives an interaction between a user and a mobile device. The mobile device can communicate with a streaming media device. Based on the interaction, an identity of the user is determined. User settings corresponding to the identity for the streaming media device are determined. The streaming media device is configured based on the user settings.

An additional embodiment is directed to system, apparatus, article of manufacture, method and/or computer program product embodiments, and/or combinations and sub-combinations thereof, for enforcing time limit and/or content restrictions against a user identified as using a media device. In a non-limiting embodiment, an apparatus may automatically identify a user who is using a media device using a network-oriented method of user discovery and/or an interaction oriented method of user discovery. The apparatus may access preferences associated with the identified user. The preferences may include time limit restrictions and/or content restrictions. The apparatus may enforce the time limit restrictions and/or content restrictions against the identified user when using the media device. In an embodiment, the network-oriented method of user discovery may be based on BLUETOOTH WIFI, address resolution protocol, and/or geolocation. In an embodiment, the interaction or user-action oriented method of user discovery may be based on voice command, biometric information and/or capacitive sensing.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
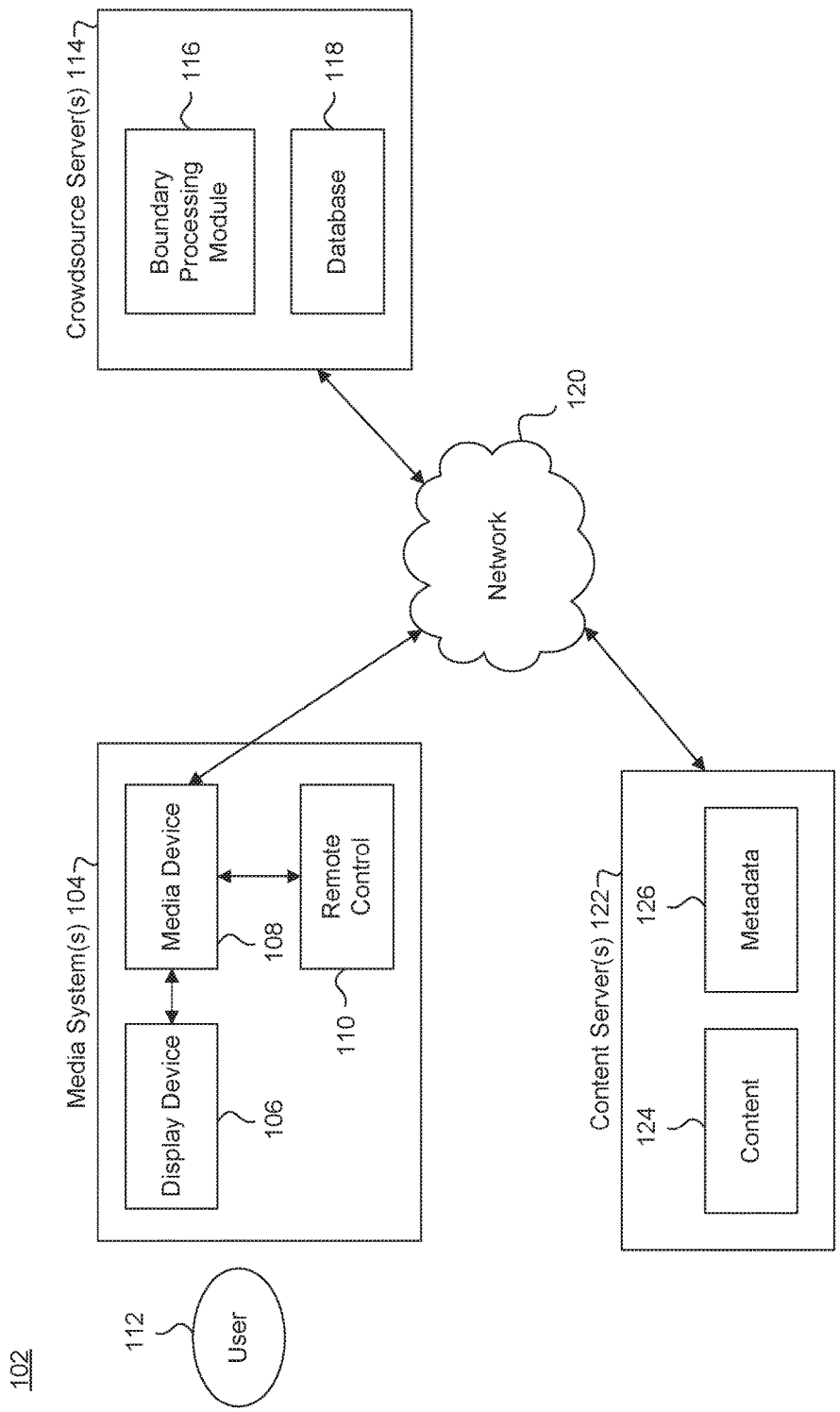
FIG. 1 illustrates a block diagram of a multimedia environment that includes one or more media systems and one or more content servers, according to some embodiments.

FIG. 1 illustrates a block diagram of a multimedia environment 102, according to some embodiments. In a non-limiting example, multimedia environment 102 is directed to streaming media.

The multimedia environment 102 may include one or more media systems 104 and one or more content servers 122 communicatively coupled to a network 120. In various embodiments, the network 120 can include, without limitation, wired and/or wireless intranet, extranet, Internet, cellular, Bluetooth and/or any other short range, long range, local, regional, global communications network, as well as any combination thereof.

Media system 104 may include a display device 106, media device 108, 302 and remote control 110. Display device 106 may be a monitor, television, computer, smart phone, tablet, and/or projector, to name just a few examples. Media device 108 may be a streaming media device, DVD device, audio/video playback device, cable box, and/or digital video recording device, to name just a few examples. In some embodiments, the media device 108 can be a part of, integrated with, operatively coupled to, and/or connected to display device 106. The media device 108 may be configured to communicate with network 120.

A user 112 may interact with media system 104 via remote control 110. Remote control 110 can be any component, part, apparatus or method for controlling media device 108 and/or display device 106, such as a remote control, a tablet, laptop computer, smartphone, on-screen controls, integrated control buttons, or any combination thereof, to name just a few examples. In an embodiment, different users 112 may have their own remote controls 110 (e.g., mobile phones) which may be used to identify which user is interacting with the media system 104. Or, for example, multiple users 112 may use or share a particular remote control 110. Then, for example, the various embodiments of user identification as described herein may be used to identify different users 112.

Content servers 120 (also called content sources 120) may each include databases to store content 124 and metadata 126. Content 124 may include any combination of music, videos, movies, TV programs, multimedia, images, still pictures, text, graphics, gaming applications, advertisements, software, and/or any other content or data objects in electronic form. In some embodiments, metadata 126 comprises data about content 124. For example, metadata 126 may include associated or ancillary information indicating or related to writer, director, producer, composer, artist, actor, summary, chapters, production, history, year, trailers, alternate versions, related content, applications, and/or any other information pertaining or relating to the content 124. Metadata 126 may also or alternatively include links to any such information pertaining or relating to the content 124. Metadata 126 may also or alternatively include one or more indexes of content 124, such as but not limited to a trick mode index.

Figure 2:
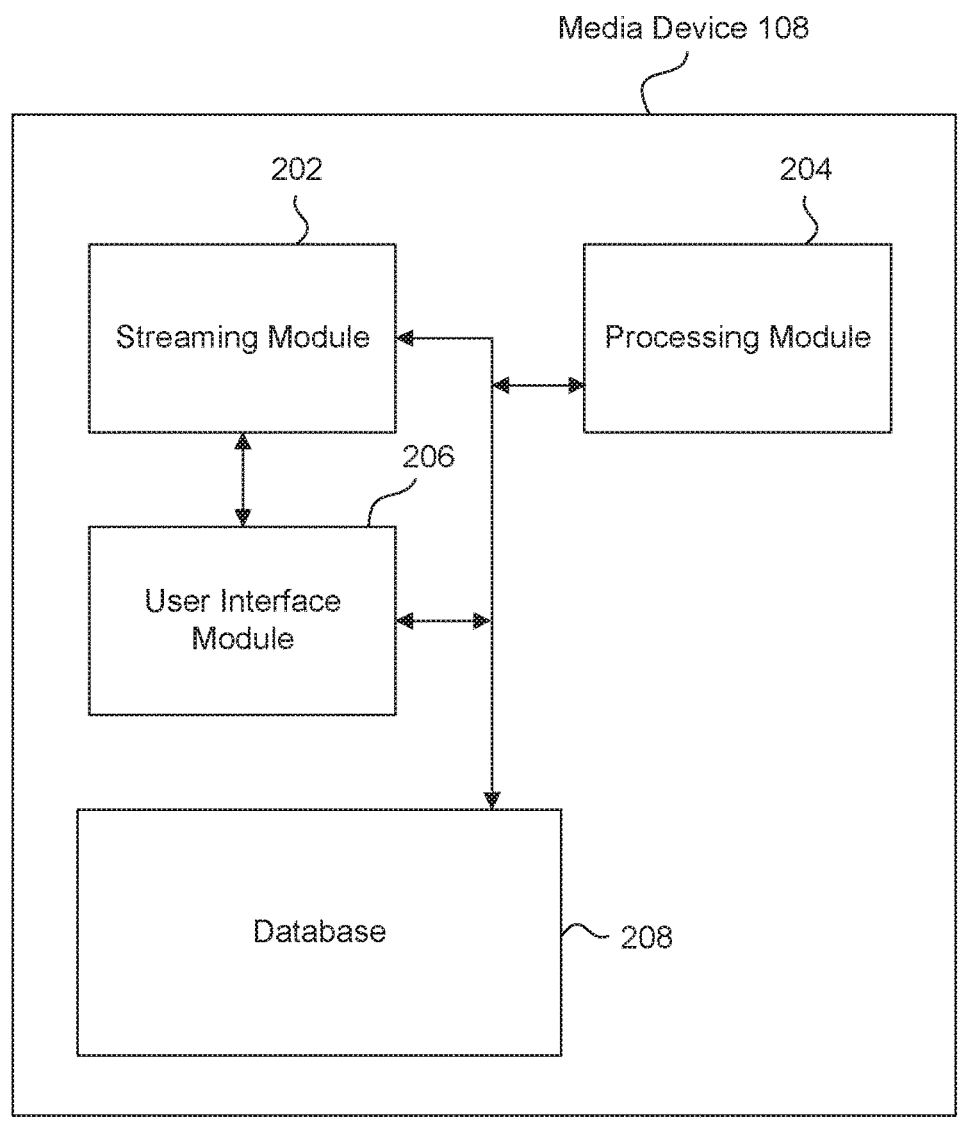
FIG. 2 illustrates a block diagram of a media device, according to some embodiments.

FIG. 2 illustrates an example block diagram of the media device 108, according to some embodiments, Media device 108 may include a streaming module 202, processing module 204, user interface module 206 and database 208.

Now referring to FIGS. 1 and 2, in some embodiments, user 112 may use remote control 110 to interact with the user interface module 206 of media device 108 to select content, such as a movie, TV show, music, book, application, game, etc. The streaming module 202 of media device 108 may request the selected content from content server(s) 122 over the network 120. Content server(s) 122 may transmit the requested content to the streaming module 202. Media device 108 may transmit the received content to display device 106 for presentation to user 112. In streaming embodiments, the streaming module 202 may transmit the content to display device 106 in real time or near real time as it receives such content from content server(s) 122. In non-streaming embodiments, media device 108 may buffer or store the content received from content server(s) 122 in database 208 for later playback on display device 106.

Network-Oriented Embodiments of User Discovery

Figure 3:
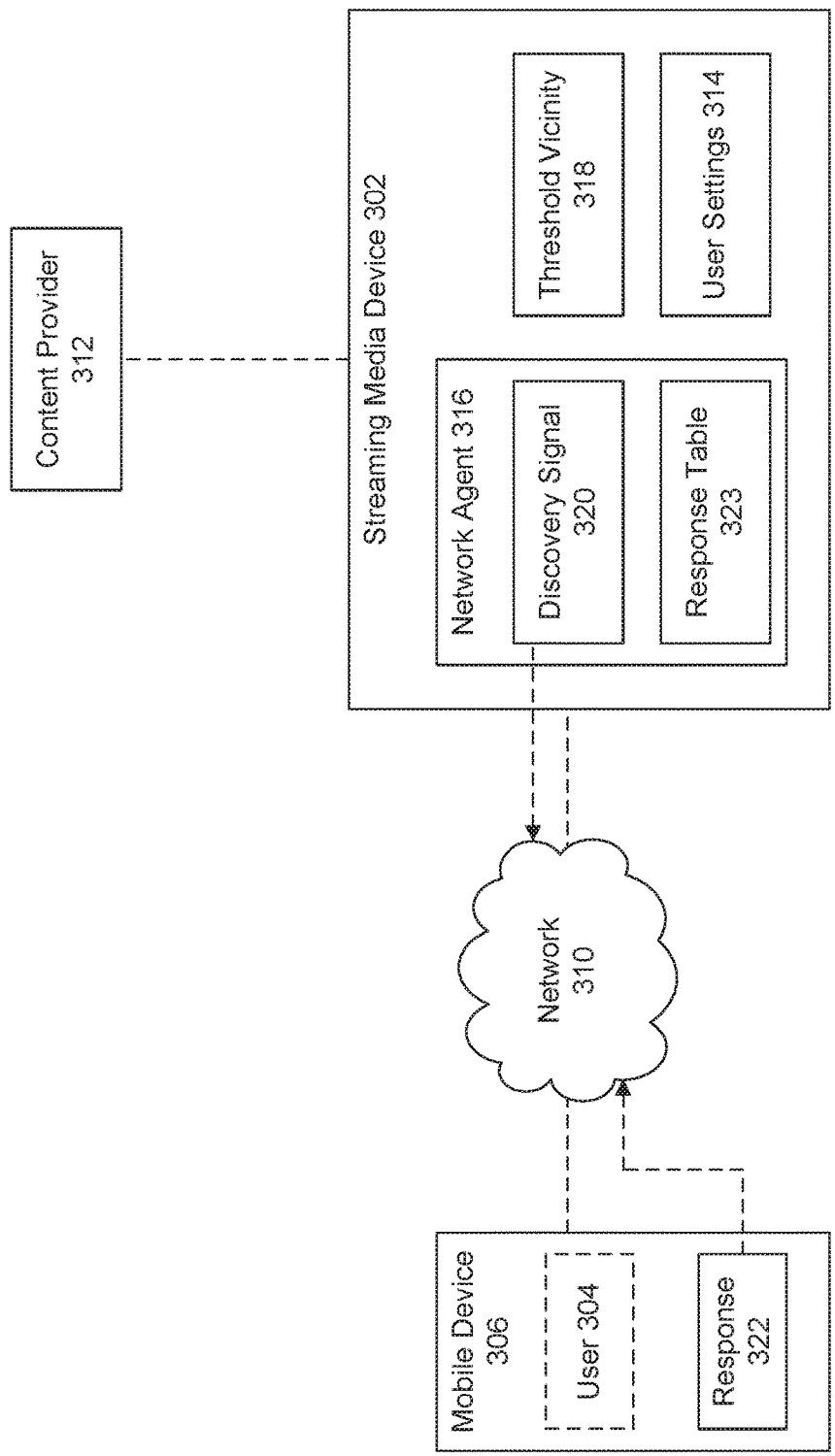
FIG. 3 is a block diagram of a network-based user identification system, according to some embodiments.

FIG. 3 is a block diagram of a network-based user identification system 300, according to some embodiments. In FIG. 3, a streaming media device 302 may identify a user 304 associated with a mobile device 306 over a network 310. In an embodiment, streaming media device 302 of FIG. 3 may correspond to or otherwise include features similar to those described herein with respect to media device 108 of FIG. 1. Similarly, in some embodiments, content provider 312 may correspond to content server 122, mobile device 306 may correspond to remote control 110, user 304 may correspond to user 112, and/or network 310 may correspond to network 120.

Streaming media device 302 may receive content (such as content 124) from one or more content providers 312. Streaming media device 302 may make the content available to one or more users 304 by displaying or otherwise making available the content for consumption via one more devices such as televisions, monitors, laptops, mobile phones, tablets, or other audio or display device 106. However, different users 304 may have different viewing preferences or settings with regard to which content they prefer and/or how they prefer to consume the respective content. These viewing preferences or settings may be tracked, saved, or otherwise accessed by streaming media device 302 as user settings 314.

In some embodiments, for streaming media device 302 to customize its content (such as the content it receives, reads, buffers, recommends or provides to user 304) and/or operation via user settings 314, streaming media device 302 identifies which user(s) 304 are using streaming media device 302 and/or consuming the content.

In some embodiments, a user 304 may manually log in and out of streaming media device 302 (including signing in/out of different streaming content applications operating thereon) to thereby identify himself to streaming media device 302. During operation, user 304 may set particular settings or configure streaming media device 302 based on different user preferences, which may be saved as user settings 314. Thereafter, streaming media device 302 may access the user settings 314 for that user 304 to customize its content and operation for the user 314.

However, after a user 304 logs into streaming media device 302, the user 304 may leave a geographic vicinity of streaming media device 302 without notifying (i.e., logging out) streaming media device 302 or the applications executing thereon. For example, a first user may begin playing content via streaming media device 302, and a second user may take over control of streaming media device 302 after the first user leaves the room or geographic vicinity of streaming media device 302. But, because the streaming media device 302 continues to customize its content and operation for the first user, the second user's viewing experience may not be as satisfying. Accordingly, some embodiments of this disclosure operate to automatically determine which user(s) 304 are within a geographic vicinity of streaming media device 302, and to customize its content and operation for those users 304 who are located within a threshold distance of the streaming media device 302. Accordingly, in the provided example, when the first user leaves and the second user enters the room, streaming media device 302, content, and/or one more other devices may be configured based on the user settings 314 for the second user and/or other users detected in the room or within a threshold vicinity 318 of the streaming media device 302.

In some embodiments, a network agent 316 may identify which mobile device(s) 306 are within a threshold vicinity 318 of streaming media device 302. Streaming media device 302 may assume that the user(s) 304 associated with those identified mobile device(s) 306 are using the streaming media device 302. Accordingly, the streaming media device 302 may customize which content is provided and/or how the content is presented for those user(s) 304 using the user setting(s) 314 respectively associated with the user(s) 304. In an embodiment, network agent 316 may ping the detected device(s) 306 to determine which devices user settings 314 should be loaded.

In some embodiments, network agent 316 may transmit a signal over a network 310 to detect which mobile devices 306 are within the threshold vicinity 318. In an embodiment, the signal may be a discovery signal 320. Discovery signal 320 may be a signal transmit over network 310 to one or more device(s) communicatively coupled or potentially communicatively coupled to network 310. Network 310 may provide wired and/or wireless communicative coupling between devices. In an embodiment, network 310 may be a WiFi, local area, wide area, or other network. In another embodiment, network 310 may include a Bluetooth network (or other short range communication coupling) that allows two or more devices to communicate directly with one another. Network agent 316 may be part of streaming media device 302, or may be a standalone processor or device that is communicatively coupled to streaming media device 302.

Network agent 316 may receive a response 322 to discovery signal 320 from mobile device 306 via network 310. In some embodiments, the mobile device 306 may be within a vicinity or range of the streaming media device 302 to have received the discovery signal 320, or may be communicatively connected to network 310. In an embodiment, network agent 316 may determine which user(s) 304 or user settings 314 are associated with a mobile device 306 based on a response table 323. For example, response 322 may include identifying information that may be used to identify mobile device 306 and/or one or more user 304. For example, mobile device 306 may return a device identifier code. Network agent 316 may compare the received code against the data of response table 323 to identify which user 304 is registered to the device with the received code and/or what user settings 314 to load.

Based on response 322, network agent 316 may determine which mobile device(s) 306 are within threshold vicinity 318, and for which users 304, user settings 314 should be loaded. In an embodiment, if multiple mobile devices 306 are detected within threshold vicinity 318, a union, intersection, or other combination or delineation of user settings 314 may be used for the multiple devices 306 (e.g., such as based on a relative priority of the users 304/mobile devices 306). Various example embodiments on how a system may respond when multiple mobile devices 306 or users 304 are identified within threshold vicinity 318 are described in U.S. patent application Ser. No. 14/813,703 entitled "Detection Of A Mobile Device To Identify User Preferences And Provide Customized Functionality Or Content," referenced above. Or, for example, if no mobile devices 306 are detected to be within threshold vicinity 318, then a default or most-recently used set of user settings 314 may be used.

Discovery signal 320 and/or response 322 may vary depending on the nature or type of network 310 communications being used. For example, in Bluetooth communication, discovery signal 320 may be a Bluetooth beacon (e.g., a hardware processor that can transmit or broadcast its identifying information to electronic devices within a particular range of transmission). In an embodiment, response 322 may be a Bluetooth pairing request from mobile device 306 or a signal indicating that mobile device 306 is within a pairing range (e.g., threshold vicinity 318) of streaming media device 302.

In an embodiment, network agent 316 may be configured to operate as an access point (e.g., WiFi access point). When acting as an access point, the network agent 316 may provide one or more user devices 306 access to, for example, the internet using a wireless network standard such as IEEE 802.11. Additionally, in some embodiments, the network agent 316 may operate as a node in, for example, an ad hoc peer-to-peer network. When acting as a node in a peer-to-peer network, one or more user devices 306 may connect to the network agent using, for example, Bluetooth, Bluetooth LE, or any suitable wireless connection. The network agent 316 may, in these embodiments, maintain a record of which mobile devices 306 (if any) are connected to via the network agent 316 at any given time. Additionally, in such embodiments, discovery signal 320 may be a record that identifies which mobile device(s) 306 (if any) are communicatively coupled to the access point of streaming media device 302.

In an embodiment, network agent 316 may communicate with mobile devices 306 using an address resolution protocol (ARP). For example, in ARP, network agent 316 may determine a media access control (MAC) address of a device registered with or that may have previously interacted with streaming media device 302. Network agent 316 may transmit discovery signal 320 with the MAC address of one or more devices. Then, for example, if the identified device 306 (e.g., with the corresponding MAC address) is on or otherwise communicatively coupled to network 310 and receives the signal 320, the mobile device 306 may return response 322 to network agent 316 via network 310. In an embodiment, response 322 may include or indicate an internet protocol (IP) address of mobile device 306 on network 306. Then, for example, network agent 316 may not only determine mobile device 306 is within threshold vicinity 318, but may also communicate directly with mobile device 306 using the IP address.

In an embodiment, if no device responds to discovery signal 320 (e.g., if no device 306 has or is associated with the indicated MAC address), network agent 316 may try another, different MAC address of another known device 306. In an embodiment, network agent 316 may discontinue probing for mobile devices 306 as soon as one mobile device 306 responds. In another embodiment, network agent 316 may continue transmitting discovery signals 320 with all known or a threshold or predetermined number of MAC addresses to determine if multiple mobile devices 306 are currently communicatively coupled to network 310 or are otherwise within threshold vicinity 318.

In an embodiment, network agent 316 may determine the location or vicinity of mobile device 306 relative to streaming media device 302 using geolocation signals. In an embodiment, a geolocation signal may be a global positioning system (GPS) signal. For example, network agent 316 may determine GPS data for the position of streaming media device 302 using any well known process or technology, and may receive GPS data from one or more mobile device 306 (e.g., in response 322) indicating a location of the mobile device 306. Network agent 316 may calculate a distance between the streaming media device 302 and the mobile device based on the differences in the GPS data. The calculated distance can be used to determine whether the location of mobile device is within a threshold vicinity 318 of streaming media device 302.

In an embodiment, a geolocation signal may indicate a location of mobile device 306, a location of mobile device 306 relative to streaming media device 302, or a location of mobile device 306 within a building or other structure associated with streaming media device 302. For example, network agent 316 may store data representing a map of different global positioning points that delineate different rooms of a house or building, including a location of streaming media device 302 as being globally located within one of the rooms. Then, for example, network agent 316 may compare a GPS received from mobile device 306 against the map to determine in which room mobile device 306 is located. If mobile device 306 is determined to be located in the one or more rooms defined by threshold vicinity 318, the corresponding user settings 314 may be loaded.

In some embodiments, threshold vicinity 318 may be an indication of whether or not mobile device 306 is within a likely range of interaction with streaming media device 302. In an embodiment, if a mobile device 306 is determined to be within threshold vicinity 318 of the streaming media device 302, then user settings 314 for a corresponding, known, or likely user 304 of the detected mobile device 306 may be accessed and used by streaming media device 302 to customized its content and/or operation for that user 304.

For example, with regard to geolocation signals, if the location of mobile device 306 is determined to be within a particular distance (e.g., radius) of streaming media device 302, then the user 304 may be determined to be within the threshold vicinity 318 and thus interacting with streaming media device 302. Then, for example, user settings 314 of the user 304 may be used to configure streaming media device 302. In an embodiment, threshold vicinity 318 may indicate a distance from the streaming media device 302, a relative location (e.g., whether or not mobile device 306 and streaming media device 302 are within the dwelling or same room of a dwelling), or a strength of signal. For example, a signal or connection (e.g., Bluetooth connection) between streaming media device 302 and mobile device 306 having a signal strength above a predefined threshold (as specified by the threshold vicinity 318) may indicate the user 304 associated with the mobile device 306 is using the streaming media device 302.

Based on the determination that a mobile device 306 is within threshold vicinity 318, streaming media device 302 may determine which user 304 is associated with the device 306. For example, a user 304 of mobile device 302 may have previously registered with streaming media device 302 or one or more applications operating on or in communication with streaming media device 302 (e.g., including an app on mobile device 306) identifying the user 304. Then, for example, based on the identification of mobile device 306 to be within threshold vicinity 318, the corresponding user 304 may be identified as a user who is currently using streaming media device 302, and the corresponding user settings 314 may be retrieved (e.g., from a memory, from a database, from the cloud, from content provider 312, or from mobile device 306). Or for example, mobile device 306 itself may have user settings 314 associated with it (e.g., based on a previous usage history by one or more users using the device 306), which may not be specific to any particular user 304.

In an embodiment, mobile device 306 may configure itself differently when it is within threshold vicinity 318 of streaming media device 302, such that mobile device 306 is configured to operate or communicate with streaming media device 302, including receiving or playing content from streaming media device 302. For example, mobile device 306 may automatically launch an app operating on mobile device 306, such that the app enables mobile device to communicate with streaming media device 302. Such communications may include sending commands and receiving content. Or, for example, mobile device 306 may automatically mute a finger, such that user 304 is not interrupted by a phone call while watching or consuming content via streaming media device 302.

User settings 314 may include any settings associated with identifying content to be provided or recommended to users 304, or how that content is to be delivered/provided to users 304 (e.g., via streaming media device 302). In an embodiment, the identified user account information may be provided to content providers 312 or applications operating on streaming media device 302 to adjust which content is provided, made available, or otherwise suggested to user 304. Or, for example, user settings 314 may indicate specific device preferences or settings such as volume, brightness, hue, or other device settings. Streaming media player 302 may then adjust its own settings or the settings of one or more networked devices based on user settings 314. For example, streaming media device 302 may command a stereo to lower its volume, or command a monitor to enter theater mode.

Figure 4:
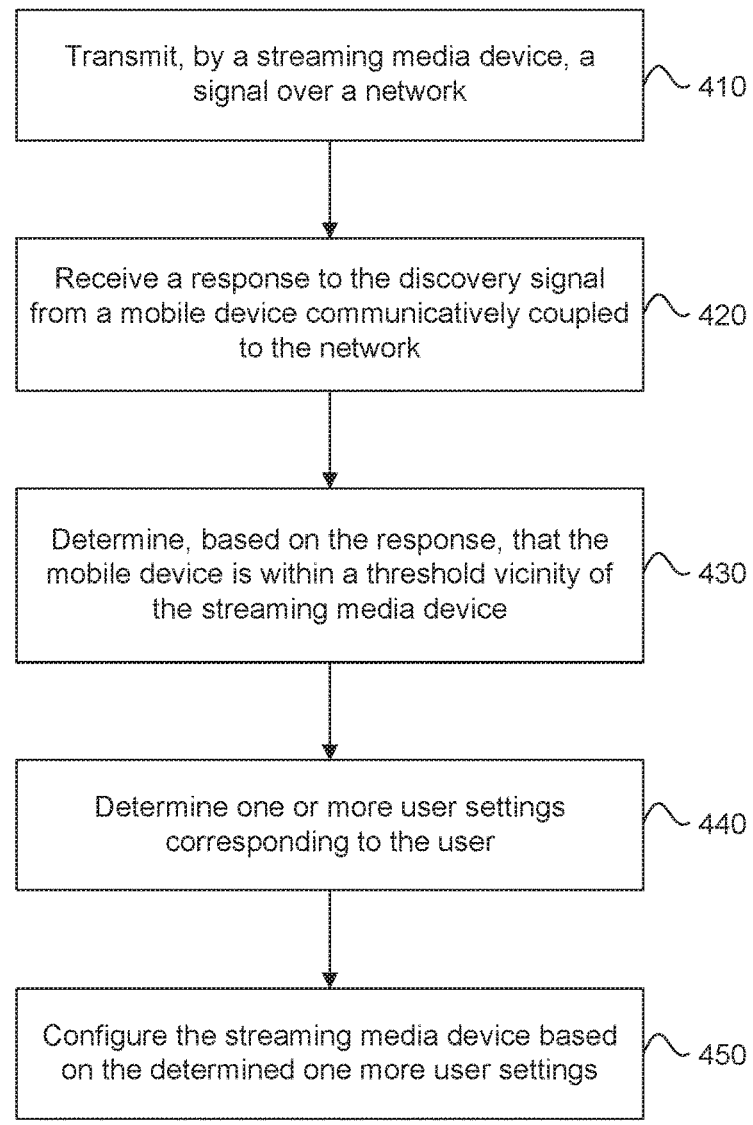
FIG. 4 is a flowchart illustrating a process for network-based user identification, according to some embodiments.

FIG. 4 is a flowchart illustrating a process 400 for network based user identification, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to FIG. 3. However, method 400 is not limited to that example embodiment.

In 410, a streaming media device transmits a signal via a network. For example, network agent 316 may transmit discovery signal 320 via network 310 to any mobile devices 306 that may be communicatively coupled to network 310. Depending on the type of network connectivity, the characteristics of discovery signal 320 may vary. For example, a WiFi discovery signal 320 may be transmit in a first embodiment, while a Bluetooth beacon signal may be transmit in a second embodiment.

In 420, a response to the discovery signal is received from a mobile device communicatively coupled to the network. For example, network agent 316 may receive a response from one or more mobile devices 306 indicating that they received the discovery signal 320. In an embodiment, response 322 may indicate a location of mobile device 306 (either an absolute location, or a location relative to streaming media device 302). For example, response 322 may include GPS functionality such that it transmits a global positioning signal (e.g., response 322) indicating a location of mobile device 306.

In 430, based on the response of 420, it is determined that the mobile device is within a threshold vicinity of the streaming media device. For example, network agent 316 in 430 may determine whether mobile device 306 is within threshold vicinity 318, and may accordingly determine a likelihood of whether or not mobile device 306 (or user 304) is interacting with streaming media device 302. Threshold vicinity 318 may be any indicator of distance, time, or network connectivity that may be used to determine a likelihood of a user 304 (associated with a corresponding mobile device 306) interacting with or consuming content from streaming media device 302. For example, network agent 316 may determine whether the (global) position of mobile device 306 is within a range (e.g., radius) of positions indicated by threshold vicinity 318).

Or, for example, if two mobile devices 306 were detected on network 310. Network agent 316 may determine from which mobile device(s) 306 commands had been received. For example, if commands to operate streaming media device 302 were only received from a first mobile device within the previous 60 minutes (or other time frame), then only the user settings 314 corresponding to the first mobile device may be loaded.

In 440, one or more user settings corresponding to the user are determined. For example, if in 430 mobile device 306 is determined with be within threshold vicinity 318, then in 440 user settings 314 for that mobile device 306 or the user 304 associated with the mobile device 306 may be retrieved. If multiple mobile devices 306 are determined in 430 to meet threshold vicinity criteria 318, then user settings 314 for one or more of those mobile devices 306 may be retrieved and used depending on the characteristics of the mobile devices 306. For example, in some embodiments, different mobile devices 306 may have different priorities (for example, parents may be assigned higher priorities than children, and priorities may be different for different parts of the day). Accordingly, in such embodiments, the user settings 314 for the highest priority mobile device 306 may be retrieved in 440. Or, for example, a union or intersection of user settings 314 may be used in different embodiments.

In 450, the streaming media device is configured according to the user settings 314 retrieved in 440. For example, the selection of content offered or recommended by streaming media device 302 may be adjusted based on the retrieved user settings 314. Or, for example, characteristics of different devices may be configured based on the retrieved user settings 314. Such characteristics may pertain to audio, video, and/or other multimedia controls, to name just few examples.

User-Oriented or Interaction-Based Methods of User Discovery

Figure 5:
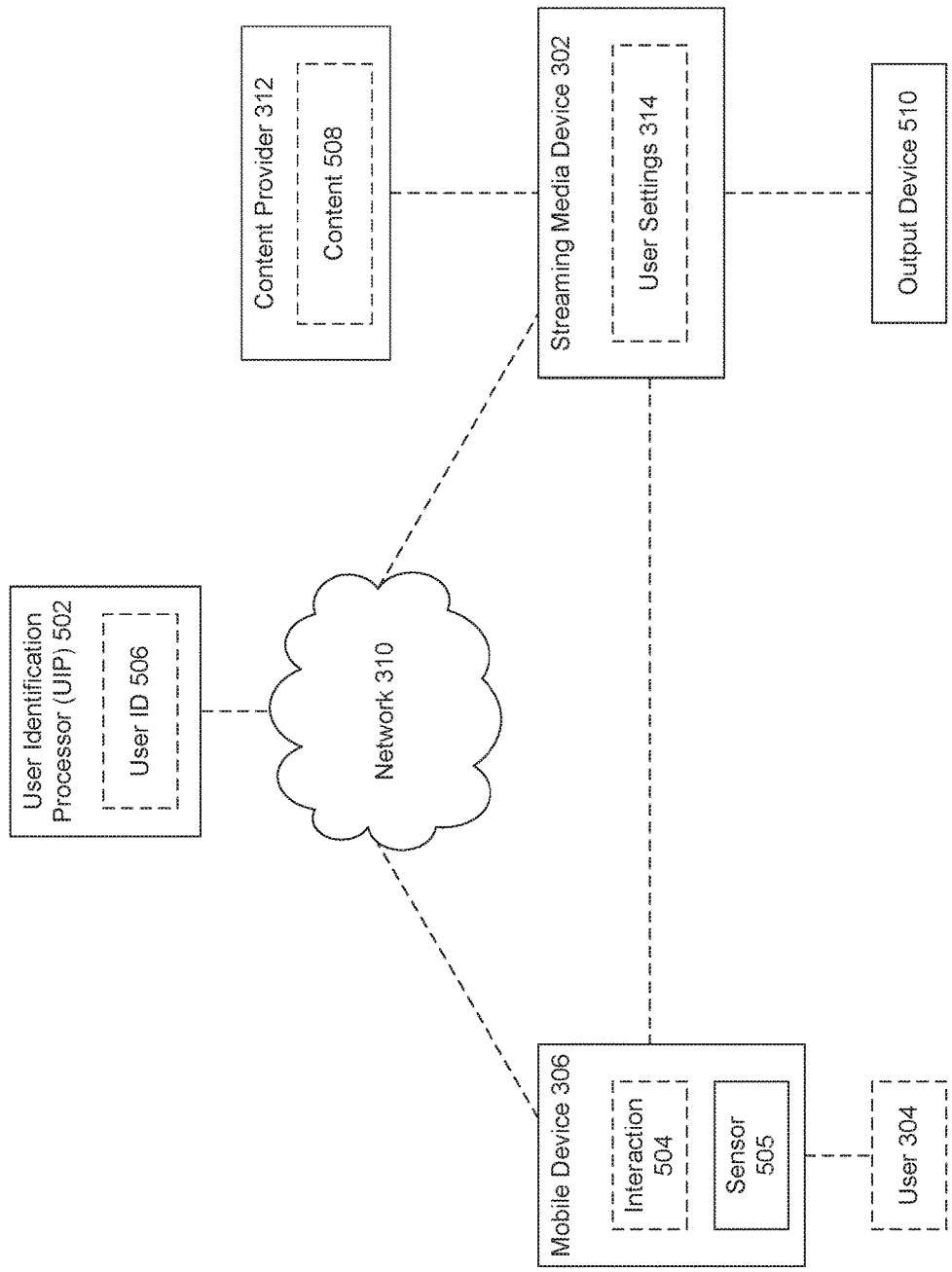
FIG. 5 is a block diagram of an interaction-based user identification system, according to some embodiments.

FIG. 5 is a block diagram of an interaction-based user identification system 500, according to some embodiments. Some of the features of the system 500 may include features similar to those described above with respect to system 102 of FIG. 1. For example, content 508 and output device 510 of FIG. 5 may correspond to content 124 and display device 106 of FIG. 1, respectively.

A user identification processor (UIP) 502 may identify which user 304 is currently using mobile device 306. Accordingly, if it is determined that the mobile device 306 is within a vicinity of the streaming media device 302 (using any embodiment described herein), then it can be assumed that the identified user 304 is currently using the streaming media device 302. User settings 314 associated with the user 304 may then be accessed to customize the operation of streaming media device 302 for that user 304.

Although UIP 502 is shown in FIG. 5 as being a standalone processor or device, in other embodiments UIP 502 may operate on mobile device 306, on streaming media device 302, or otherwise operate as an intermediary between mobile device 306 and streaming media device 302. In another embodiment, the functionality of UIP 502 may be distributed across mobile device 306, network 310, and/or streaming media device 302. In an embodiment, the functionality of UIP 502 and network agent 316 may be combined or integrated across one or more devices.

UIP 502 may identify which user 304 is holding or operating mobile device 306 based on the user 304's interaction 504 with the mobile device 306. Mobile device 306 may be a laptop, remote control, mobile phone, tablet, or other mobile computing device. Interaction 504 may be any user interaction or action with mobile device 306. This may include for example, holding mobile device 306, pressing one or more buttons or activating apps on mobile device 306 (which may or may not be commands for streaming media device 302), voice commands, readings from one or more sensors, etc. Based on the interaction(s) 504, UIP 502 may determine a user identification (ID) 506 corresponding to a user 304 or likely user 304 of mobile device 306. The user ID 506 may then be used to retrieve user settings 314 to customize the operation of streaming media device 302.

As just noted, mobile device 306 (e.g., remote control) or UIP 502 may be equipped with one or more sensors used to identify which user 304 is operating or handling the mobile device 306. In an embodiment, mobile device 306 may include one or more pressure sensors that may be used to identify a particular user based on the pressure used to grasp or operate (e.g., push one or more buttons) on remote device 306. For example, between two users of mobile device 306, one may press buttons on mobile device 306 with greater or a different (distinguishable) force than the other user. Thus, even without a specific profile set up, UIP 502 may identify which of several users 304 is operating mobile device 306 based on the relative pressure sensed. Similarly, the timing between button presses may be used to distinguish between different users 304. For example, one user may be more prone to switch channels rapidly, while another user may perform a similar action at a different or distinguishable speed (e.g., more slowly).

In an embodiment, interaction 504 may be a voice command issued by user 304. For example, UIP 502 may be enabled or configured to identify user 304 based on previous voice commands or phrases spoken by user 304. In an embodiment, user 304 may speak a number of different phases that enable or train UIP 502 to identify the user's voice. For example, UIP 502 may prompt user 304 to speak different words or phrases, and analyze the voice responses to set up a digital profile of a user's voiceprint. That voiceprint may then be used to identify user 304.

In some embodiments, mobile device 306 may have a microphone that may detect sounds, including the user's voice. UIP 502 may receive the detected sounds of the microphone, and identify one or more users 304 who may be present. In an embodiment, voice samples collected from and/or voiceprint determined of the user 304 may be stored in the cloud or other memory. For example, UIP 502 may store or have access to a database or other storage of previously collected and identified user voice samples. Sounds collected from microphone may then be compared against the identified samples to determine which users 304 may be present. In an embodiment, different users may be identified by different user IDs 506. In an embodiment, UIP 502 may prompt user 304 to confirm the identification or may otherwise notify the user 304 of the identification before, during, or after configuration of streaming media device 302 based on corresponding user settings 314. Or, for example, the microphone may periodically "listen" for sounds/voices to transmit to UIP 502 for identification.

In another embodiment, UIP 502 may not have or need pre-stored or preconfigured voice samples to identify or distinguish amongst different users 304. For example, in a particular household, two users may use mobile device 306. Using voice recognition technology, UIP 502 may be able to distinguish between the voices based on various audio characteristics (e.g., bass, tone, pitch) of two or more users. For example, the voices of a man and a woman, or two men, or three women may all register differently. Even without a preconfigured identity to match to the voice, a profile or bin may be set up for each characteristic voice detected. For example, the viewing habits of the person with the deep voice may be monitored and stored in their profile. The same may be done for the person with the higher pitched voice.

Then, for example, IMP 502 may identify the users as being the one with the deep voice or the one with the high pitch. Based on which user was identified, recommended or associated programming or advertisements may be provided to the user based on the user's corresponding profile information. This may be performed with or without specifically requiring each user to set up a voice profile. For example, through monitoring and machine learning, UIP 502 may determine how many users are using the system, and create distinguishing profiles for the users based on the monitored voice samples.

In an embodiment, UIP 502 may identify voices of multiple users 304 with corresponding user IDs 506. UIP 502 may then determine that (a) the voice with the strongest voice signal is the user ID 506 which is used for user settings 314, (b) user settings 314 for all the detected users should be retrieved and used, or (c) the user settings 314 for a user ID 506 with a highest priority is retrieved and used. Interaction 504 may be a voice command issued to operate streaming media device 302 or a particular user identification phrase. In an embodiment, UIP 502 may continuously or periodically "listen" for voices using a microphone of mobile device 306 and may dynamically adjust user settings 314 as different users 304 are identified.

In another embodiment, different mobile devices 306 may correspond to different users 304. For example, different users 304 may each have their own designed remote control or mobile phone. Then, for example, interaction 504 may be a command issued (e.g., through a button press) to streaming media device 302. With the command, mobile device 306 may transmit a mobile device code or user identifier code that is received by UIP 502 and used to identify user ID 506.

In an embodiment, UIP 502 may occasionally or periodically broadcast or prompt any mobile devices 306 within a network range of streaming media device 302 to respond with their respective codes. Then, for example, based on which codes are received, UIP 502 may identify the users 304 who are likely to be watching television or otherwise consuming content from streaming media device 302 and may configure streaming media device 302 with the appropriate and corresponding user settings 314.

In an embodiment, interaction 504 may include biometric information determined by sensor 505. Sensor 505 may be a biometric scanner or sensor used to determine various biometric features of user 304. In an embodiment, sensor 505 may be a face or fingerprint scanner connected to mobile device 306. From the scanned biometric information, UIP 502 may identify a corresponding user ID 506 and load the corresponding user settings 314 for the identified user 304. Or, for example, mobile device 306 may include different buttons or key combinations corresponding to different users 304. Then, for example, when a user 304 begins interacting with mobile device 306 to control streaming media device 302, the user 304 may select or enter the corresponding user identification button or key combination on mobile device 306. UIP 502 may receive the corresponding user code for the selected button or key combination and may identify the corresponding user ID 506 and/or user settings 314.

In an embodiment, sensor 505 may be a capacitance sensor with a capacitive sensing capability. For example, capacitance sensor 505 may be able to measure fluid displacement based on how a user 304 is handling or holding mobile device 306 (which may be a remote control). Based on the fluid displacement or other capacitance changes, sensor 505 or UIP 502 may be able determine or estimate a hand size of the user or detect which user(s) 304 are likely to be handling mobile device 306. This determination may be made, at least in part, based on a previous usage and identification of user 304 during which mobile device 306 detected similar capacitance changes. In an embodiment, sensor 505 may be an accelerometer used to identify user based on how user 304 is handling mobile device.

In an embodiment, a combination of sensors 505 may be used to identify user 304. For example, a microphone or voice sensor may be used with a thermal indicator that may determine the temperature of the hand holding the mobile device 306. Then, based on one or more of the sensors 505, UIP 502 may identify the user 304. For example, a first registered user 304 may generally have colder hands than a second registered user 304; then, based on the thermal indicator, TAP 502 may identify the corresponding user 304.

Based on which user(s) 304 or user ID(s) 506 were identified by UIP 502, streaming media device 302 may retrieve the corresponding user settings 314 for the identified user 304 or combination of users 304. As previously described, user settings 314 may be used to select which content 508 to make available or recommend to the identified user 304.

Or, for example, user settings 314 may be used to configure one or more output devices 510. Output device 510 may include a computer, television, stereo, or other video, audio, or multimedia equipment. Also, in an embodiment, control of output device 501 may include controlling the lighting of a room, which may vary based on different user settings 314 or preferences as to how they prefer to watch television or movies in low light or with an abundance of light). For example, a first user 304 may prefer to watch movies in low light and television shows in bright light, while a second user 304 may prefer to experience all content in medium light.

As noted above, in an embodiment, the functionality of UIP 502 and network agent 316 may be combined. Accordingly, for example, a system may use multiple, alternative, or a combination of both networked-based and user interaction-based techniques to identify users 304 in a room who may be operating or consuming content from a streaming media or other device 302. Based on this user identification, an enhanced user experience may be configured for the user(s) 304 based on the corresponding user settings 314.

Figure 6:
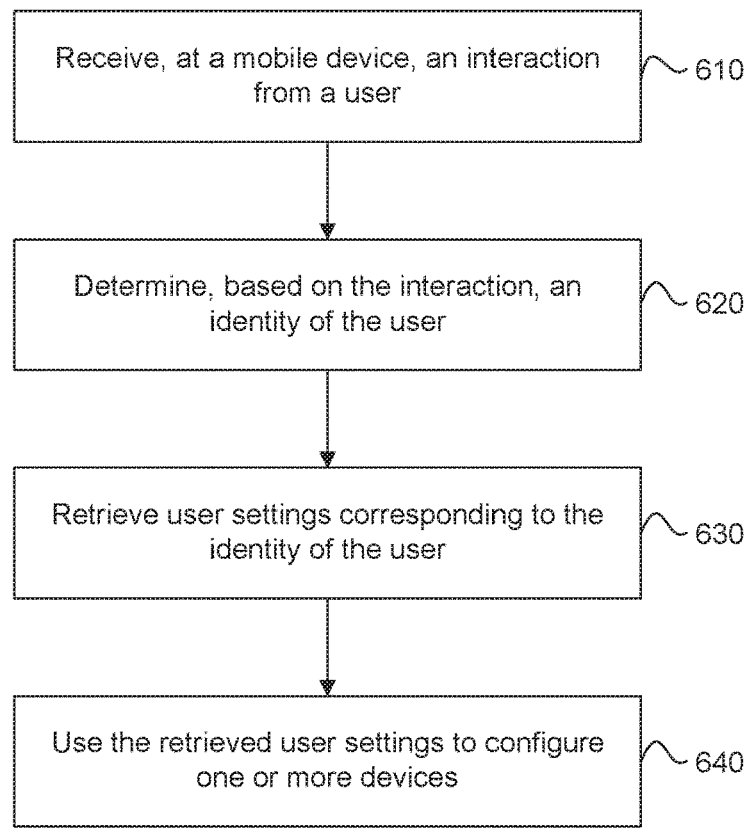
FIG. 6 is a flowchart illustrating a process for interaction-based user identification, according to some embodiments.

FIG. 6 is a flowchart 600 illustrating a process for network based user identification, according to some embodiments.

Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art. Method 600 shall be described with reference to FIG. 5. However, method 600 is not limited to that example embodiment.

In 610, an interaction from a user is received from a mobile device. For example, user 304 may issue a command by pressing a button or a voice command to streaming media device 302 using mobile device 306. The received command represents interaction 504. Or, for example, mobile device 306 may receive sensor input from a sensor 505 such as a temperature gauge, capacitance change, fingerprint, or face scanner as interaction 504. In another embodiment, user 304 may activate an interaction sensor 505 on mobile device 306, after which mobile device 306 or TAP 502 receives or prompts users 304 for interaction 504.

In 620, an identity of the user is determined based on the interaction 504. For example, UIP 502 may compare interaction 504 to stored information about previous interactions 504 across one or more devices 306 by one or more users 304 to determine a match between interaction 504 and stored interactions 504. For example, a voice command or sample from user 304 may be compared to previously received and stored voice samples or a voiceprint, which may be used to identify user 304.

In 630, user settings 314 corresponding to the identified user 304 are retrieved. For example, UIP 502, streaming media device 302, and/or mobile device 306 may identify and retrieve user settings 314 corresponding to user ID 506. User settings 314 may correspond to settings for mobile device 306, streaming media device 302, content 508, and/or output device 510, for example.

In 640, the retrieved user settings are used to configure streaming media device 302 and/or other devices, such as output device 510. In an embodiment, the user settings 314 may be retrieved by mobile device 306 and provided to an application operating on mobile device 306, which may then communicate the user settings to one or more of streaming media device 302 or output device 510. Or, for example, user settings 314 or user ID 506 may be provided to content provider 312, such that content provider 312 may provide the appropriate or corresponding content 608 to streaming media device 302 corresponding to the identified user ID 506.

Figure 7:
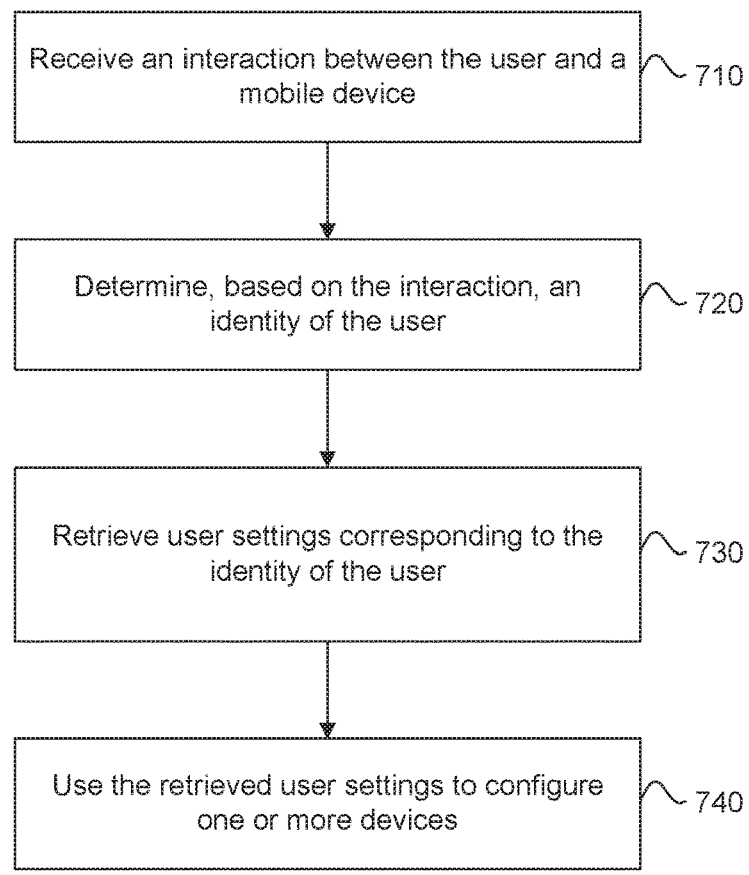
FIG. 7 is a flowchart illustrating another process for interaction-based user identification, according to some embodiments.

FIG. 7 is a flowchart illustrating another process for network based user identification, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art. Method 700 shall be described with reference to FIG. 5. However, method 700 is not limited to that example embodiment.

In 710, an interaction between a user and a mobile device is received. For example, sensor 505 may determine an interaction by and/or biometric reading of user 304. In an embodiment, sensor 505 may determine or receive interaction 502 after notifying or prompting the user 304 for interaction 502. In another embodiment, sensor 505 may determine interaction 502 through normal operation of mobile device 306 by user 304 without a particular notification or prompt that interaction 502 is being determined or detected.

In 720, an identification of a user of a mobile device based on an interaction 504 between the user and the mobile device is determined. For example, UIP 502 may receive interaction or sensor reading from sensor 505. UIP 502 may then compare the sensor reading to previously determined sensor readings that have been determined to be associated with particular users. Based on a comparison of the received sensor readings to the stored previously-identified sensor readings, UIP 502 may determine an identity of user 304 as user ID 506.

In 730, user settings 314 corresponding to the identified user 304 are retrieved. For example, streaming media device 302 may retrieve from local storage or receive (e.g., over network 310) or from one or more other devices user settings 314 corresponding to user ID 506. In 740, the retrieved user settings are used to configure streaming media device 302 and/or other devices, such as output device 510. Steps 730 and 740 are similar to steps 630 and 640 of FIG. 6.

Time and Content Restrictions Based on User-Identification

The ability to identify the user 304 who is using the media device 108, 302 (using any of the embodiments described herein) enables a multitude of functionality customized to the user 304. As described above, such customization includes selecting content to make available or recommend to the user 304, and/or adjusting the presentation of such content according to the preferences of the user 304. Some embodiments provide other customized functionality as shall now be described.

Figure 8:
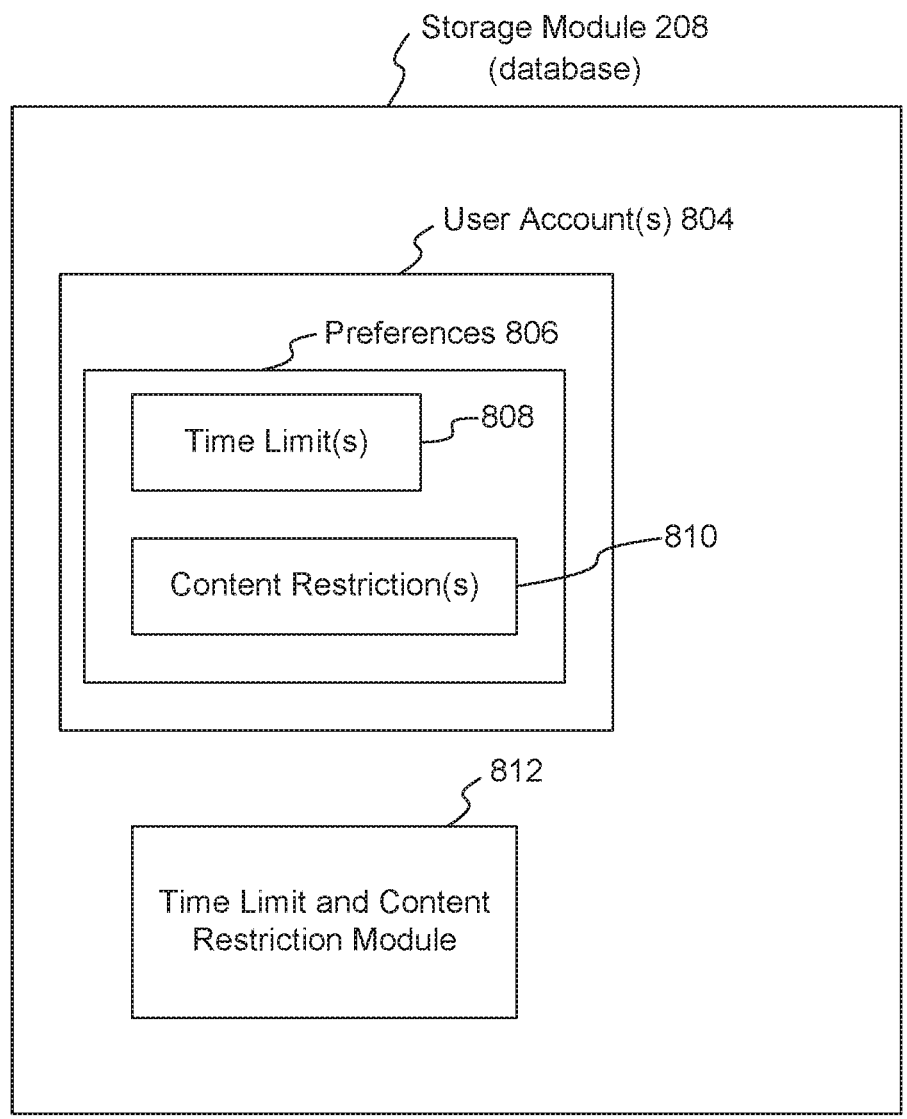
FIG. 8 illustrates a storage module that stores information relating to user accounts, wherein the user account information specifies time limits and content restrictions applicable to users associated with the user accounts, according to some embodiments.

As shown in FIG. 8, in some embodiments, storage module (database) 208 of the media device 108, 302 may store information associated with one or more user accounts 804, wherein each user account 804 corresponds to a user 304 or a group of users. Each user account 804 may include one or more preferences 806, such as time limit(s) 808 and/or content restrictions) 810. In some embodiments, the time limits 808 specify the amount of time the user 304 associated with the user account 804 is allowed to use components of system 102 such as the media device 108, the display device 106, etc. For example, adult users may have an unlimited amount of time, whereas a child user may have a limited amount of time.

In some embodiments, the content restriction(s) 810 may restrict the type of content the user 304 associated with the user account 804 is allowed to display using the media device 108. For example, adult users may have no content restrictions, whereas a child user may be restricted from displaying PG13, R, NR and/or X rated content.

It is noted that the content restrictions 810 are not be limited to content ratings. Instead, in some embodiments, content restrictions 810 may be based on type of content, particular movies and/or TV shows, actors, themes, time periods, locations, languages, free or fee based, political, etc., or any combination thereof.

In some embodiments, an administrator (such as a parent) may set the values of the time limits 808 and content restrictions 810.

The storage module 208 may include a time limit and content restriction module 812. The time limit and content restriction module 812 may represent control logic (such as software) that, when executed by one or more processors of the media device 108, 302, cause the media device 108, 302 to enforce the time limits 808 and/or content restrictions 810 associated with the user who has been identified as using the media device 108, 302.

Figure 9:
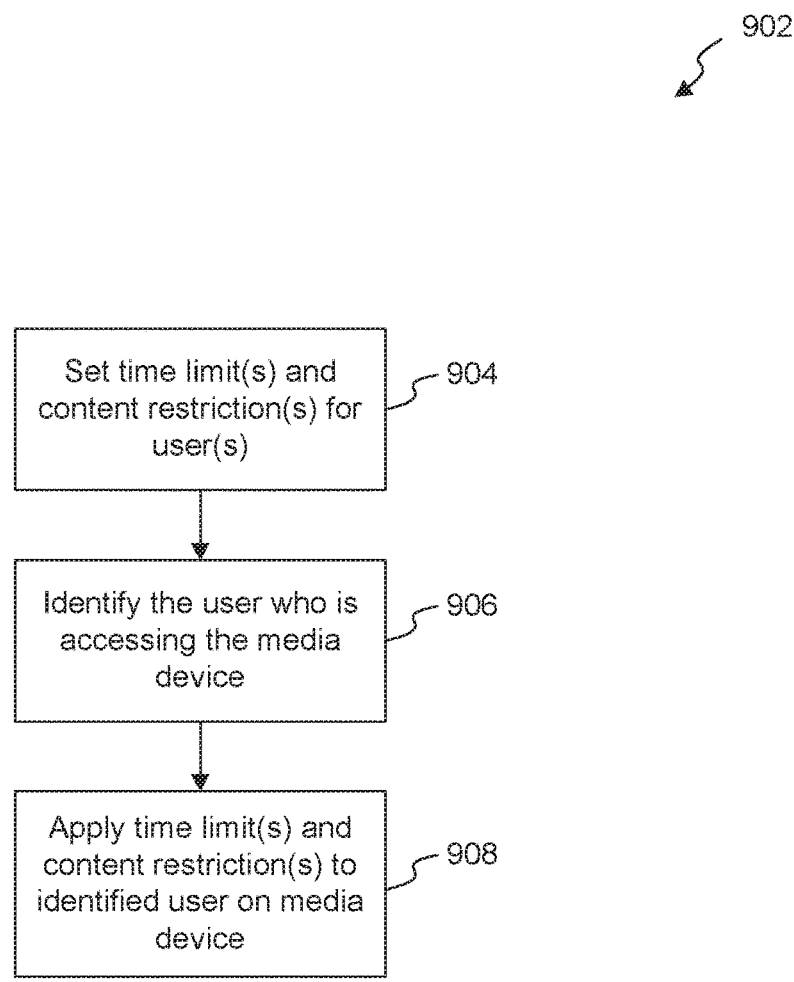
FIG. 9 is a flowchart for enforcing time limits and content restrictions for a user identified as using a media device, according to some embodiments.

FIG. 9 is a method 902 for enforcing time limits and content restrictions for a user identified as using a media streaming media device 108, 302, according to some embodiments. Method 902 can be performed by processing logic that can comprise hardware (e.g., circuitry, dedicated logic, programmable logic, microcode, etc.), software (e.g., instructions executing on a processing media device 108, 302), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art. Method 902 shall be described with reference to FIGS. 1 and 8. However, method 902 is not limited to that example embodiment.

In 904, an administrator may set time limits and/or content restrictions for users who will be using the media device 108, 302. For example, using remote control 110, the administrator may access the user accounts 804 for any or all of the users of the media device 108, 302, and set the time limits 808 and/or content restrictions 810 for those users.

In 906, the media device 108, 302 may identify the user who is accessing the media device 108, 302, using any of the embodiments described herein.

In 908, the time limit and content restriction module 812 may cause the media device 108, 302 to access the user account 804 of the identified user, and enforce the time limits 808 and content restrictions 810 stored therein against the identified user as he uses the media device 108, 302.

Figure 10:
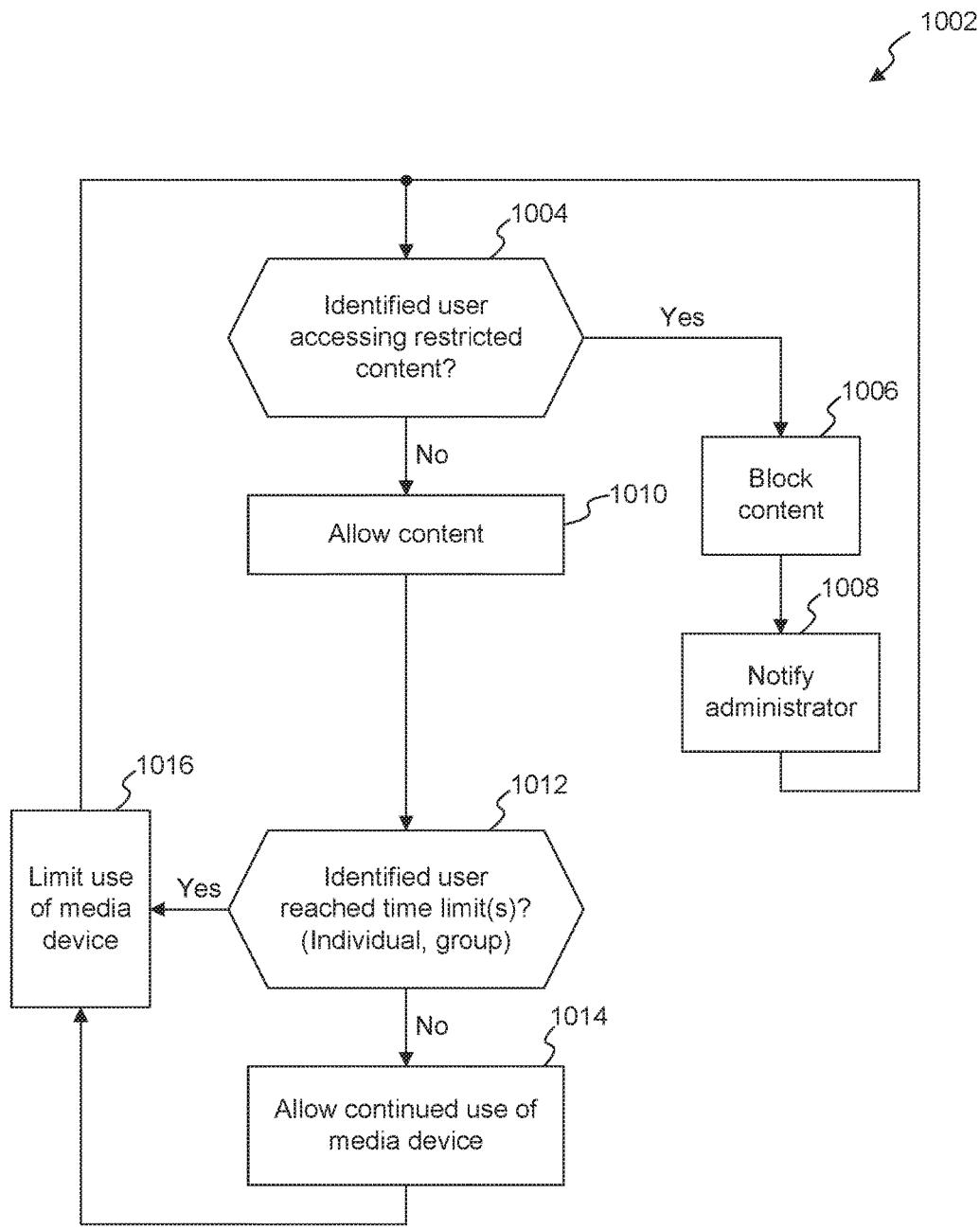
FIG. 10 is a more detailed flowchart for enforcing time limits and content restrictions for a user identified as using a media streaming media device, according to some embodiments.

In some embodiments, step 908 may be performed according to method 1002 shown in FIG. 10. Method 1002 can be performed by processing logic that can comprise hardware (e.g., circuitry, dedicated logic, programmable logic, microcode, etc.), software (e.g., instructions executing on a processing media device 108, 302), or a combination thereof. It is to be appreciated that not all steps may be needed to perform the disclosure provided herein. Further, some of the steps may be performed simultaneously, or in a different order than shown in FIG. 10, as will be understood by a person of ordinary skill in the art. Method 1002 shall be described with reference to FIGS. 1 and 8. However, method 1002 is not limited to that example embodiment.

In 1004, the time limit and content restriction module 812 may cause the media device 108, 302 to determine if the user 304 is accessing restricted content as specified by the content restrictions 810 of the user account 804 associated with the user 304. For example, in 1004, when the user 304 attempts to use the media device 108, 302 to access content, the media device 108, 302 may determine the rating of the content. The media device 108, 302 may determine the rating by accessing metadata 126 associated with the content 124, or searching the Internet (or other sources) for the rating of the content. Then, the media device 108, 302 may compare the rating of the requested content with the user's content restrictions 810, to determine if the user 304 is attempting to access restricted content. If the user 304 is attempting to access restricted content, then 1006 is performed. Otherwise 1010 is performed.

In 1006, the time limit and content restriction module 812 may cause the media device 108, 302 to block the requested content. For example, in 1006, the media device 108, 302 may not request the content from the content server 122 or display the content on the display device 806.

In 1008, the time limit and content restriction module 812 may cause the media device 108, 302 to notify the administrator of the user's request to access restricted content. For example, in 1008, the media device 108, 302 may send an email or text to the administrator. In response, the administrator may instruct the media device 108, 302 to waive the restrictions and allow the user 304 to access the requested content (for example, the administrator may text back ALLOW to the media device 108, 302).

If, in 1004, it is determined the user is not attempting to access restricted content, then 1010 is performed. In 1010, the time limit and content restriction module 812 may cause the media device 108, 302 to allow the requested content. For example, in 1010, the media device 108, 302 may request the content from the content server 122, and display the content on the display device 806 as the content is received from the content server 122 via the network 120.

In 1012, the time limit and content restriction module 812 may cause the media device 108, 302 to determine whether the user 304 has reached the time limits 808 specified in the user account 804 associated with the user. For example, the media device 108, 302 may maintain a timer of the amount of time the user uses the media device 108, 302.

The time limits may be based on session, day, week, month, or any other time increment. The time limits may also include individual and/or group time limits. For example, the time limits 808 associated with the user may include a session time limit, a daily time limit, and a family time limit. If, in 1012, the media device 108, 302 determines that any of those time limits have been exceeded, then 1016 is performed, wherein the media device 108, 302 limits the user's use of the media device 108, 302. For example, the media device 108, 302 may discontinue responding to the user's commands using the remote control 110, and/or may discontinue displaying the requested content on the display device 806. Additionally or alternatively, the media device 108, 302 may notify the administrator (via email or text). In response, the administrator may instruct the media device 108, 302 to waive or increase the time limits 808 to allow the user 304 to continue to use the media device 108, 302 (for example, the administrator may text back ALLOW to the media device 108, 302).

If, in 1012, the media device 108, 302 determines that none of the time limits associated with the user have been exceeded, then 1014 is performed wherein the media device 108, 302 may allow the user to continue to use the media device 108, 302. For example, the media device 108, 302 may continue to respond to the user's commands using the remote control 110, and/or may continue to display the requested content on the display device 806.

Example Computer System

Figure 11:
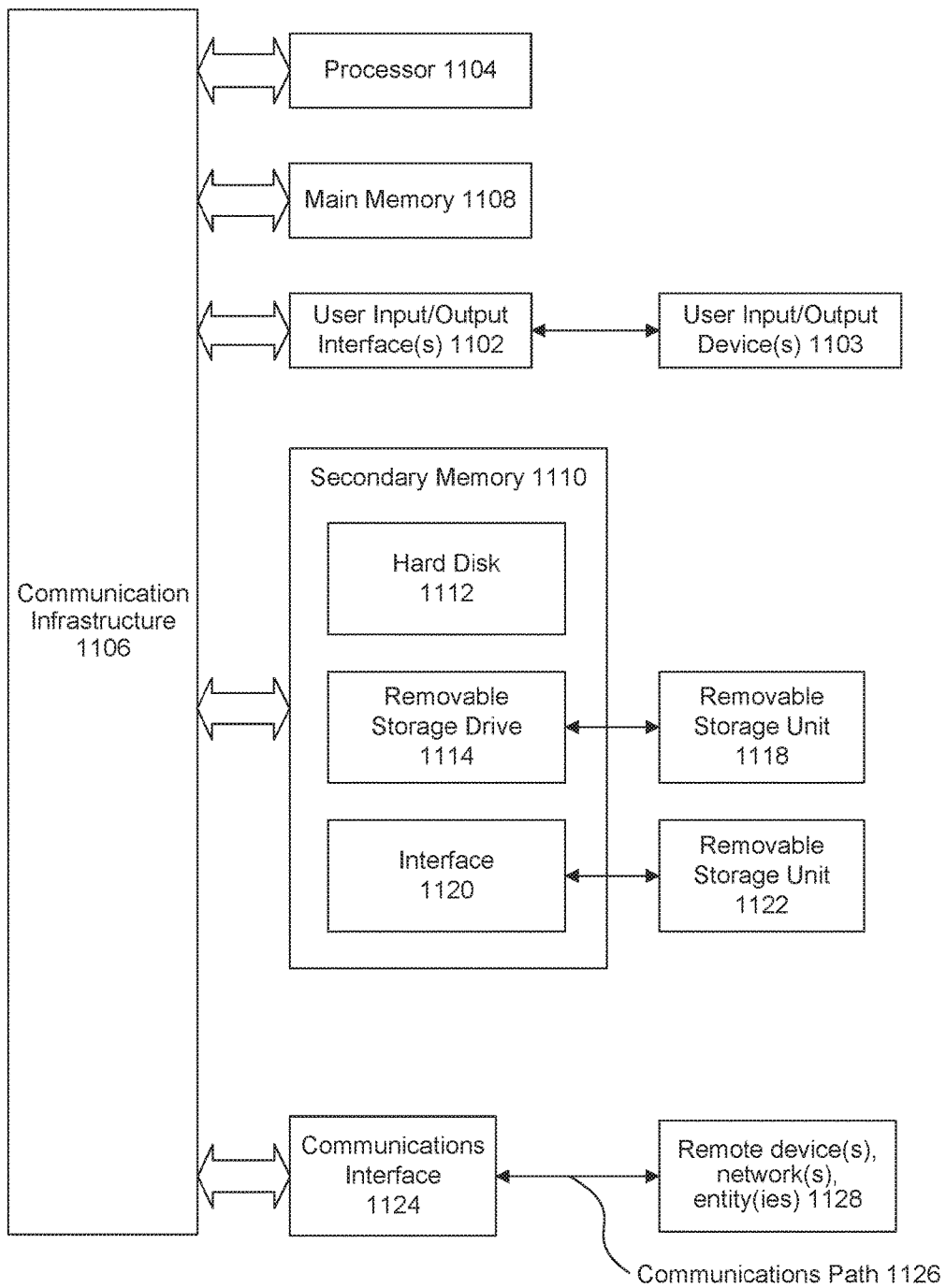
FIG. 11 illustrates an example: computer system useful for implementing various embodiments.

Various embodiments and/or components therein can be implemented, for example, using one or more computer systems, such as computer system 1100 shown in FIG. 11. Computer system 1100 can be any computer or computing device capable of performing the functions described herein. For example, one or more computer systems 1100 can be used to implement any embodiments of FIGS. 1-10, and/or any combination or sub-combination thereof.

Computer system 1100 includes one or more processors (also called central processing units, or CPUs), such as a processor 1104. Processor 1104 is connected to a communication infrastructure or bus 1106.

One or more processors 1104 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 1100 also includes user input/output device(s) 1103, such as monitors, keyboards, pointing devices, etc., that communicate with communication infrastructure 1106 through user input/output interface(s) 1102.

Computer system 1100 also includes a main or primary memory 1108, such as random access memory (RAM). Main memory 1108 can include one or more levels of cache. Main memory 1108 has stored therein control logic (i.e., computer software) and/or data.

Computer system 1100 can also include one or more secondary storage devices or memory 1110. Secondary memory 1110 can include, for example, a hard disk drive 1112 and/or a removable storage device or drive 1114. Removable storage drive 1114 can be a floppy disk drive, a magnetic tape drive, a compact disk drive, an optical storage device, tape backup device, and/or any other storage device/drive.

Removable storage drive 1114 can interact with a removable storage unit 1118. Removable storage unit 1118 includes a computer usable or readable storage device having stored thereon computer software (control logic) and/or data. Removable storage unit 1118 can be a floppy disk, magnetic tape, compact disk, DVD, optical storage disk, and/any other computer data storage device. Removable storage drive 1114 reads from and/or writes to removable storage unit 1118 in a well-known manner.

According to an exemplary embodiment, secondary memory 1110 can include other means, instrumentalities or other approaches for allowing computer programs and/or other instructions and/or data to be accessed by computer system 1100. Such means, instrumentalities or other approaches can include, for example, a removable storage unit 1122 and an interface 1120. Examples of the removable storage unit 1122 and the interface 1120 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 can further include a communication or network interface 1124. Communication interface 1124 enables computer system 1100 to communicate and interact with any combination of remote devices, remote networks, remote entities, etc. (individually and collectively referenced by reference number 1128). For example, communication interface 1124 can allow computer system 1100 to communicate with remote devices 1128 over communications path 1126, which can be wired and/or wireless, and which can include any combination of LANs, WANs, the Internet, etc. Control logic and/or data can be transmitted to and from computer system 1100 via communication path 1126.

In some embodiments, a tangible apparatus or article of manufacture comprising a tangible computer useable or readable medium having control logic (software) stored thereon is also referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 11. In particular, embodiments can operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly, described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
determining a media access control (MAC) address of a mobile device that has registered with a streaming media device;
transmitting, by the streaming media device, a discovery signal comprising a first address resolution protocol (ARP) signal including the MAC address over a network wherein any devices connected to the network are configured to receive the discovery signal;
determining that no mobile device responds to the first ARP signal;
determining a second MAC address of a second mobile device that has registered with the streaming media device; and
transmitting a second ARP discovery signal indicating the second MAC address;
receiving, by the streaming media device, a response to the second ARP discovery signal corresponding to the second MAC address, wherein the second mobile device is associated with a user of the streaming media device;
determining, based on the response, that the second mobile device is within a threshold vicinity of the streaming media device;
determining one or more user settings corresponding to the user; and
configuring the streaming media device based on the determined one more user settings.

2. The method of claim 1, wherein the receiving comprises receiving the response from the second mobile device, wherein the MAC address identifies the second mobile device.

3. The method of claim 2, wherein the determining based on the response comprises determining an internet protocol (IP) address of the second mobile device.

4. The method of claim 3, further comprising transmitting a message to the IP address of the second mobile device.

5. The method of claim 1, wherein the determining one or more user settings comprises:
determining an identification of the user based on sounds received via a microphone on the user device, wherein the sounds correspond to a voice of the user.

6. The method of claim 1, wherein the transmitting comprises:
determining a plurality of MAC addresses of a plurality of mobile devices that have registered with the streaming media device; and
transmitting a plurality of discovery signals, wherein each discovery signal corresponds to one of the plurality of MAC addresses.

7. The method of claim 6, wherein at least one of the plurality of discovery signals is transmit after receiving the response.

8. A system, comprising:
a memory; and
at least one processor coupled to the memory and configured to:
determine a media access control (MAC) address of a mobile device that has registered with a streaming media device
transmit a discovery signal comprising a first address resolution protocol (ARP) signal including the MAC address over a network wherein any devices connected to the network are configured to receive the discovery signal;
determine that no mobile device responds to the first ARP signal;
determine a second MAC address of a second mobile device that has registered with the streaming media device; and
transmit a second ARP discovery signal indicating the second MAC address;
receive a response to the second ARP discovery signal corresponding to the second MAC address, wherein the second mobile device is associated with a user of the streaming media device;
determine, based on the response, that the second mobile device is within a threshold vicinity of the streaming media device;
determine one or more user settings corresponding to the user; and
configure the streaming media device based on the determined one more user settings.

9. The system of claim 8, wherein to receive, the at least one processor is configured to receive the response from the second mobile device, wherein the MAC address identifies the second mobile device.

10. The system of claim 9, wherein to determine based on the response, the at least one processor is configured to determine an internet protocol (IP) address of the second mobile device.

11. The system of claim 10, wherein the at least one processor is further configured to transmit a message to the IP address of the mobile device.

12. A tangible computer-readable device having instructions stored thereon that, when executed by at least one computing device, cause the at least one computing device to perform operations comprising:
determining a media access control (MAC) address of a mobile device that has registered with a streaming media device;
transmitting, by the streaming media device, a discovery signal comprising a first address resolution protocol (ARP) signal including the MAC address over a network wherein any devices connected to the network are configured to receive the discovery signal;
determining that no mobile device responds to the first ARP signal;
determining a second MAC address of a second mobile device that has registered with the streaming media device; and
transmitting a second ARP discovery signal indicating the second MAC address;
receiving, by the streaming media device, a response to the second ARP discovery signal corresponding to the second MAC address, wherein the second mobile device is associated with a user of the streaming media device;
determining, based on the response, that the second mobile device is within a threshold vicinity of the streaming media device;
determining one or more user settings corresponding to the user; and
configuring the streaming media device based on the determined one more user settings.

* * * * *